United States Patent [19]

Henne et al.

[11] 4,332,752
[45] Jun. 1, 1982

[54] PROCESS FOR PRODUCTION OF DIALYSIS MEMBRANE HOLLOW FIBER CHAINS

[75] Inventors: Werner Henne; Werner Bandel; Gustav Dünweg, all of Wuppertal, Fed. Rep. of Germany

[73] Assignee: Akzo N.V., Arnhem, Netherlands

[21] Appl. No.: 80,788

[22] Filed: Oct. 1, 1979

[30] Foreign Application Priority Data

Oct. 2, 1978 [DE] Fed. Rep. of Germany ....... 2842835
Feb. 21, 1979 [DE] Fed. Rep. of Germany ....... 2806576

[51] Int. Cl.³ .............................................. B29D 27/00
[52] U.S. Cl. ..................... 264/41; 264/561; 264/177 F; 264/199; 264/209.1
[58] Field of Search ...................... 264/177 F, 41, 561, 264/209.1, 199

[56] References Cited

U.S. PATENT DOCUMENTS

| | | | |
|---|---|---|---|
| 808,148 | 12/1905 | Ernst | 264/198 |
| 1,375,824 | 4/1921 | Borzykowski | 264/199 |
| 1,394,270 | 10/1921 | Brandenberger | 264/103 |
| 1,401,943 | 12/1921 | Borzykowski | 264/198 |
| 1,975,323 | 10/1934 | Jessen | 264/199 |
| 2,399,259 | 4/1946 | Taylor | 428/398 |
| 2,440,226 | 4/1948 | Swank | 264/103 |
| 2,558,734 | 7/1951 | Cresswell | 425/68 |
| 3,161,706 | 12/1964 | Peters | 264/103 |
| 4,127,625 | 11/1978 | Arisaka et al. | 264/177 F |
| 4,164,437 | 8/1979 | Henne et al. | 264/211 |

FOREIGN PATENT DOCUMENTS

| | | | |
|---|---|---|---|
| 41-8294 | 4/1966 | Japan | 264/177 F |
| 43-7411 | 3/1968 | Japan | 264/177 F |
| 50-59518 | 5/1975 | Japan | 264/177 F |
| 52-12810 | 4/1977 | Japan | 264/177 F |
| 456436 | 8/1935 | United Kingdom | 264/199 |

*Primary Examiner*—Jay H. Woo
*Attorney, Agent, or Firm*—Michael J. Striker

[57] ABSTRACT

Dialysis membranes are described in which two or more hollow fibers of cellulose regenerated from cuoxam solution are spun together and connected to each other parallel to the fiber axis. The connection may be in the form of crosspieces, which should be between about 1 and 3 times the thickness of the hollow fiber walls. A novel process for preparation of the dialysis membrane hollow fibers is also disclosed.

5 Claims, 6 Drawing Figures

PROCESS FOR PRODUCTION OF DIALYSIS MEMBRANE HOLLOW FIBER CHAINS

BACKGROUND OF THE INVENTION

The invention concerns a dialysis membrane from cellulose regenerated from cuoxam solution, i.e. an ammoniacal solution of cupric hydroxide which dissolves cellulose in the form of a hollow fiber with a continuous hollow interior.

From DE-PS No. 736 321 are known hollow fibers from regenerated cellulose which is regenerated from cuoxam solution, with continuous hollow interiors.

The U.S. Pat. No. 3,228,877 teaches that hollow fibers prepared as described in DE-PS 736 321 can be used as dialysis membranes and as membranes for reverse osmosis.

From US-PS No. 3,888,771 are known hollow fibers from cellulose regenerated from cuoxam solutions which exhibit a defined membrane structure and which along the total axis of the fiber have uniform wall thickness and a true circular cross-section. In addition, the hollow fibers are highly stretched and exhibit high tensile strength. With this type of high stretching of cellulose regenerated from cuoxam solutions, one observes a double refraction $\Delta n$ of 0.03. Although the high strength which can be obtained through stretching of the fibers is desirable, it is of great disadvantage to the swelling ability of the membrane and thereby for the effectiveness in dialysis.

In dialysis, for example in hemodialysis, it is advantageous that the dialysis membranes, in the form of hollow fibers, are associated into bundles. The fine hollow fibers form bundles, in which the hollow fibers can lie very close together quite easily, and they have a tendency at fiber densities of between about 500 to 1000 fibers/cm$^2$ to associate very tightly along their entire lengths, in a manner analogous to the glass plate effect between two flat parallel plates.

Through this association, the introduction of dialysate liquids into the intermediate spaces between the hollow fibers is made much more difficult, and the surfaces at which the fibers lie closely against one another are not used in the exchange process, through which the effectiveness of the hollow fiber modules in greatly reduced.

DESCRIPTION OF THE INVENTION

It is therefore an object of the invention to provide a dialysis membrane from cellulose regenerated from cuoxam solution in the form of hollow fibers with continuous hollow interiors, in which the hollow fibers in their arrangement cannot lie so close to each other that there is a deleterious effect on the dialysis process, as well as guaranteeing constant flow parameters for the dialysate.

This object is achieved according to the invention through a dialysis membrane in which a number of hollow fibers which are connected to one another parallel to the fiber axis are spun together. This type of dialysis membrane can be easily handled, if the hollow fibers are combined with one another through a crosspiece. Nonetheless, there is the danger of a tearing of the dialysis membranes through mechanical factors if the crosspieces become too large. Therefore, the crosspiece breadth according to the invention is between 1 and 3 times the thickness of the hollow fiber walls.

By breadth of the crosspiece should be understood the distance between neighboring hollow fibers at the point of attachment, which is in addition to the thickness of the fiber walls.

Inventive dialysis membranes, comprised of a large number of hollow fibers spun together and connected parallel to the fiber axis with one another, permit the construction of right-angled dialysators, in which the dialysis membranes, in a manner similar to tube and/or flat membranes, can be arranged in parallel, defined layers and in which the dialysate flows through the gaps, the breadth of which can be kept quite constant and accurate.

The cross-sectional surface of each of the continuous hollow interiors of the inventive dialysis membranes is preferably between about $0.6 \cdot 10^{-3}$ to 0.8 mm$^2$ and the wall thickness 1 to 100 m, preferably 5 to 50 $\mu$m. At these measurements, sufficient exchange surfaces can be provided in a relatively small spaces.

Although, for example, three hollow fibers bound one under the other according to the invention suffer no decrease in dialysis effectiveness, the inventive dialysis membranes should preferably in larger numbers be so arranged when they are spun and connected to one another parallel to the fiber axis that the hollow fibers are arranged in a row, in order to avoid a negative influence on the dialysis effectiveness.

In order to increase the exchange surface in proportion to the blood volume, in a preferred form of the invention the hollow interior cross-section varies from the circular. It can for example be elliptical, reniform or flattened.

From this, that with the same blood volume with this type of dialysis membrane the exchange surface is substantially enlarged, there is already an improvement in the effectiveness of the metabolite exchange. In addition, on account of the reduced blood film thickness in a dialysis membrane of this type there is a further improvement in the effectiveness during the dialysis.

These inventive hollow fibers are prepared through coagulation of a cellulose-cuoxam solution extruded through a hollow fiber nozzle into diluted sodium hydroxide, whereby the hollow fiber spinning nozzle is immersed in the coagulation solution and the ratio of the uptake speed of the hollow fiber on the first take-up roller to the extrusion speed of the cellulose-cuoxam solution out of the ring slit of the hollow fiber spinning nozzle is 1.00 to 1.05 and the direction of the fiber path from the hollow fiber spinning nozzle to the first take-up roller forms a sharp angle with the axis of the nozzle opening.

The formation of the inventive hollow fiber forms is effected through the use of a hollow fiber nozzle with a corresponding spinning slit and a central bore for introduction of the liquid for forming the hollow interior.

Preferably the hollow fiber spinning nozzle according to the inventive process lies 5 to 10 mm deep in the aqueous sodium hydroxide. This depth is sufficient to cause a sufficiently rapid coagulation of the fiber, whereby the hollow fiber spinning nozzle opening is still well visible through the sodium hydroxide solution which is colored deep blue through the cuoxam solution.

The first take-up roller according to the inventive process is so arranged, that the spun hollow fiber does not travel directly downwards, but rather over such a course, that the direction of travel forms a sharp angle with the axis of the nozzle opening as the fiber travels from the spinning nozzle to the first take-up roller. Preferably this sharp angle lies between 15° and 70°.

In the coagulation bath according to the inventive process the freshly spun hollow fiber is transported through the use of only limited tensions. Preferably the take-up speed of the second take-up roller after the first take-up roller is only 90 to 98% that of the latter. Thereby a more limited shrinkage of the freshly spun hollow fiber occurs, while according to the prior art processes the hollow fiber is already stretched immediately after leaving the spinning nozzle.

Up to now the opinion was that for the preparation of hollow fibers, in particular those which are to serve as semipermeable membranes, and which have diameters of between about 50 to 1000 μm with wall thicknesses of 10 to 200 μm, only spinning nozzles could be used whose size was a multiple, for example 10 to 50 times, that of the hollow fiber. Within the scope of the invention, preferably hollow fiber spinning nozzles are used, with which the ratio of the measurement of the ring slit of the nozzle to the prepared hollow fiber is between 2.5 and 6.

The cellulose content of the cellulose-cuoxam solution does not differ from that customary in cellulose-cuoxam solutions for regeneration of cellulose. Preferably however the cellulose content lies between 6 to 10 weight-%, calculated from the weight of the solution. The NaOH content of the coagulation solution can be varied within a wide range. Preferably, however, it should be between about 10 and 20 weight-%, in order to guarantee a sufficiently rapid formation of the Normann-cellulose, leading to the fixing of the hollow fiber.

Insofar as the hollow fibers prepared according to the invention should or must be stretched, this is advantageously effected during the passing through the after-treatment baths.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 illustrates a cross-section of a dialysis membrane comprised of two circular hollow fibers joined together by a cross-piece.

FIG. 2 illustrates a cross-section of a dialysis membrane comprised of two hollow fibers which are combined with one another through a section of the wall and with interior cross-sections deviating from the circular.

FIG. 3 illustrates a cross-section of a dialysis membrane comprised of three hollow fibers with circular interior cross-sections.

FIG. 4 illustrates a dialysis membrane comprises of a large number of hollow fibers arranged in a row and attached to one another through crosspieces.

FIG. 5 illustrates a similar dialysis membrane comprised of a large number of hollow fibers arranged in a row and connected by crosspieces, in which the individual fibers have elliptical cross-sections.

DESCRIPTION OF THE PREFERRED EMBODIMENTS

Figure 1:
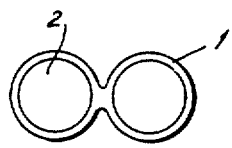
FIGS. 1-5 illustrate cross-sections of various embodiments of the inventive dialysis membranes. 1 is the membrane wall of regenerated cellulose from cuoxam solutions of the hollow fiber 2.
Figure 2:
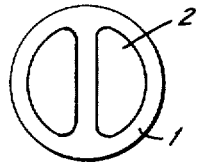
Figure 3:
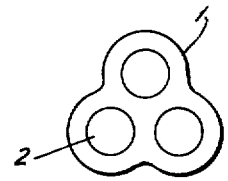
Figure 4:
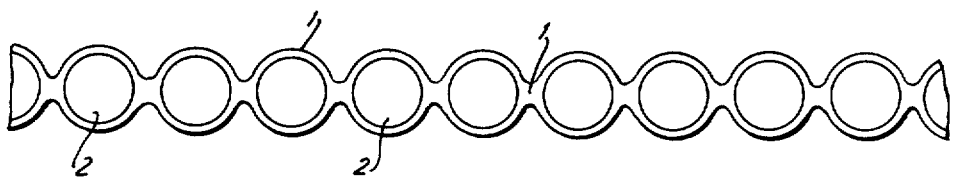
Figure 5:
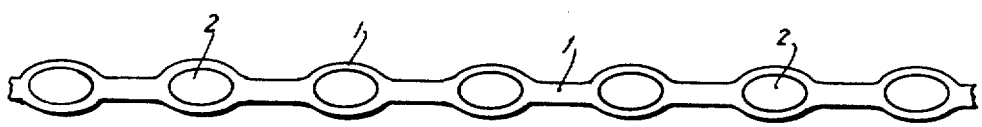
Figure 6:
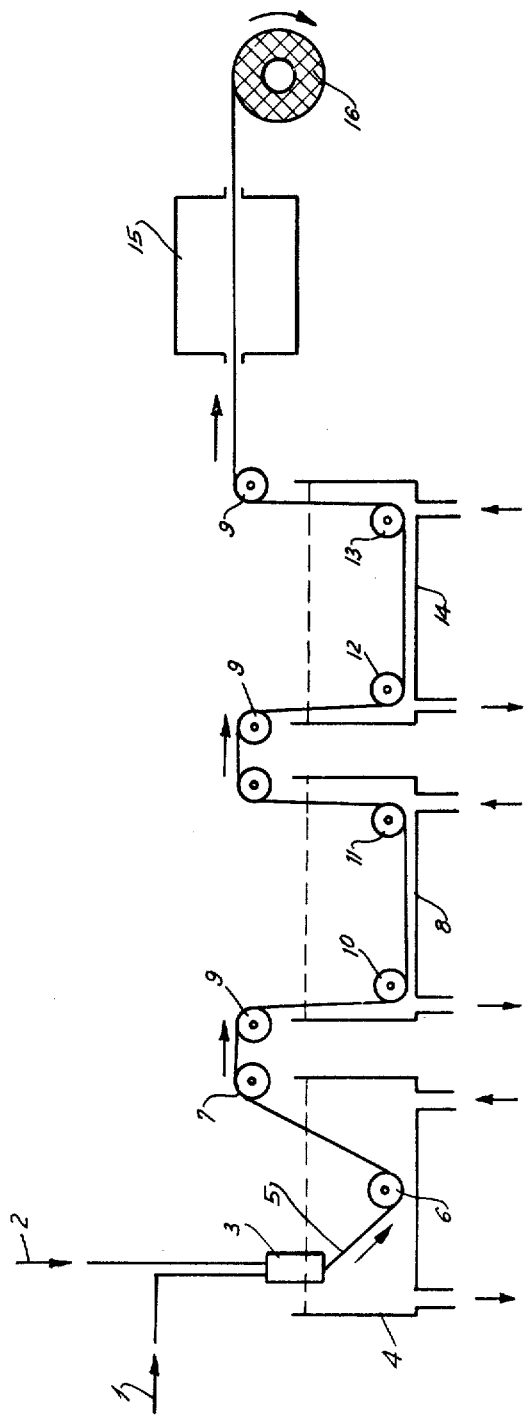
FIG. 6 illustrates in schematic form an embodiment of the inventive process.

With reference to FIG. 6, the cellulose-cuoxam solution 1 and the fluid for formation of the hollow interior 2, for example, isopropyl myristate or paraffin oil, are introduced into the hollow fiber spinning nozzle 3. This nozzle 3 is immersed in the aqueous sodium hydroxide in the coagulation bath 4. The hollow fiber 5 coming out of the spinning nozzle 3 is taken up on the first take-up roller 6 and then conveyed to the after-treatment baths via a second take-up roller 7. The direction of fiber path between the first take-up roller 6 and the hollow fiber spinning nozzle 3 forms a sharp angle with the axis of the hollow fiber opening. The after-treatment baths are advantageously constructed as tubs, of which in the sketch two are illustrated (8, 14). For the after-treatment baths, conveyor rollers 9 are provided. The rollers 10, 11, 12 and 13 are operated with increasing speed, through which the hollow fiber 5 is stretched to the desired degree. Over a final roller the washed hollow fiber 5 is introduced into the dryer 15, where it is dried, and then rolled up on spool 16.

For the after-treatment baths in general are used one after the other diluted sodium hydroxide, water, diluted sulfuric acid, "acid water", and pure water. Before the drying, the hollow fibers are advantageously treated with glycerine.

The invention may be better understood through the following examples.

EXAMPLE 1

Preparation of the inventive dialysis membrane

A cuoxam-cellulose solution with 8.3 weight-% cellulose is extruded through a hollow fiber nozzle with 24 hollow fiber slits which are connected one with the other, whereby the distance between the spinning slits corresponds to about one-third the diameter of the spinning slits, and the combination slits have a breadth corresponding to ⅔ the spinning slit breadth. The spinning nozzles have for each hollow fiber internal bores, through which isopropyl myristate is forced as the fluid for forming the hollow interior, which bores have a width of about one-fourth the spinning slit diameter.

The nozzles are so arranged, that the output openings lie about 5 mm below the surface of the precipitation bath. The bath contains 12.5% NaOH.

The extruded band of 24 hollow fibers, the outside walls of which are connected to neighboring fibers through continuous crosspieces, is transported to the first take-up roller through the precipitation bath over an angle of 40° to the axis of the hollow fiber spinning nozzle opening. Afterwards it is conveyed to the second take-up roller. The output speed of the extrusion is 30.9 m/min, the first roller, 30.9 m/min and the second roller, 30.26 m/min.

The hollow fiber is then led through the customary following baths for elimination of the copper. After a second sodium hydroxide bath follows a water wash, a sulfuric acid wash, and further water washes. The fiber is then dried in a trommel dryer and then taken up on a flanged spool.

The hollow fiber band thus obtained was about 10 mm wide and comprises 24 hollow fibers with a 250 μm diameter with a wall thickness of 18 μm, with connecting crosspieces of 50 μm and thicknesses corresponding to those of the wall of 18 μm.

EXAMPLE 2

Use of the inventive dialysis membrane for hemodialysis

A test dialysater constructed with the inventive hollow fibers shows superior properties to the prior art membranes, in spite of the exchange surfaces hindered by the crosspieces, as can be explained on account of the geometric arrangement.

A comparison was made between the inventive dialysis membrane prepared according to Example 1 and hollow fiber modules, consisting of the customary dialysis hollow fibers of cellulose regenerated from cuoxam solution, with an inner diameter of 250 μm and 18 μm wall thickness. The solution flow rate was 200 ml/min.m$^2$, the dialysate flow rate 500 ml/min.m$^2$.

The ultrafiltration rate with the inventive dialysis membrane was 2.6 ml/h m$^2$.mm Hg, the urea clearance 149 ml/min and the vitamin B-12 clearance 27 ml/min. By comparison, the customary dialysis hollow fibers exhibited an ultra-filtration rate of 2.3 ml/h m$^2$.mm Hg, a urea clearance of 133 ml/min and a vitamin B12 clearance of 24 ml/min.

We claim:

1. Process for making hollow fiber with continuous hollow interior consisting of regenerated cellulose for use in semipermeable membranes, comprising extruding a cellulose-cuoxam solution having cellulose content between 6 and 10% by weight through the annular slot of a spinneret into a coagulation bath of aqueous sodium hydroxide having sodium hydroxide content between 10 and 20% by weight while passing a cavity forming fluid through said spinneret, and guiding the formed hollow fiber over successive withdrawal rollers followed by passing the fiber to at least one after treatment bath prior to drying it, the ratio of withdrawal speed of the fiber at a first withdrawal roller to the speed of extrusion of the cellulose-cuoxam solution being 1.00:1.05, with a second withdrawal roller provided following and rotated at 90–98% of the speed of said first withdrawal roller, and the direction of path of the formed fiber between the spinneret and the first roller forming an acute angle relative to the axis of the spinneret slot.

2. The process of claim 1 wherein the spinneret nozzle is immersed by 5 to 10 mm into the aqueous sodium hydroxide.

3. The process of claim 1 wherein the said angle amounts to 15° to 70°.

4. The process of claim 1 wherein the width of the angular slot of the spinneret amounts to 2.5 to 6 times the width of the finished fiber.

5. The process of claim 1 wherein the hollow fiber is passed through a plurality of aftertreatment baths and is projected to a drawing operation thereby.

* * * * *